US006982503B1

(12) United States Patent
Chew

(10) Patent No.: US 6,982,503 B1
(45) Date of Patent: Jan. 3, 2006

(54) VOICE COIL FOR DISK DRIVE

(75) Inventor: David W. Chew, San Jose, CA (US)

(73) Assignee: Maxtor Corporation, Longmont, CO (US)

( * ) Notice: Subject to any disclaimer, the term of this patent is extended or adjusted under 35 U.S.C. 154(b) by 641 days.

(21) Appl. No.: 09/670,261

(22) Filed: Sep. 26, 2000

Related U.S. Application Data

(60) Provisional application No. 60/156,411, filed on Sep. 28, 1999.

(51) Int. Cl.
*H02K 3/04* (2006.01)

(52) U.S. Cl. .......................... 310/36; 310/81; 310/179; 310/180; 310/164; 310/194; 310/208

(58) Field of Classification Search ................. 310/36, 310/208, 164, 194, 179, 180, 81
See application file for complete search history.

(56) References Cited

U.S. PATENT DOCUMENTS 4,728,390 A * 3/1988 Yamamoto et al. ......... 310/208
5,099,162 A * 3/1992 Sawada ...................... 310/208
5,973,421 A * 10/1999 Iwabuchi ...................... 310/13
5,982,069 A * 11/1999 Rao ............................ 310/208
6,040,650 A * 3/2000 Rao ............................ 310/208

* cited by examiner

*Primary Examiner*—Darren Schuberg
*Assistant Examiner*—J. Aguirrechea
(74) *Attorney, Agent, or Firm*—David M. Sigmond

(57) ABSTRACT

A voice coil for a disk drive includes a spiral formation of winding of an electrically conductive material. This formation has a generally triangular shape with an open center. First and second active leg portions of the formation curve inward of it, and an inactive leg portion curves outward of it. The cross-sectional area of the coil varies along its length with the segments in the inactive leg portion having a smaller cross-sectional area than those of the active leg portions. The voice coil is a laminate with the conductive layer disposed between two electrically insulating layers. It lies fixedly secured to a surface of a base member of the disk drive's actuator. The method of making this laminate includes securing the conductive layer to an insulating layer, removing selected portions of the conductive layer to form the coil, and covering the conductive layer with another insulating layer.

60 Claims, 1 Drawing Sheet

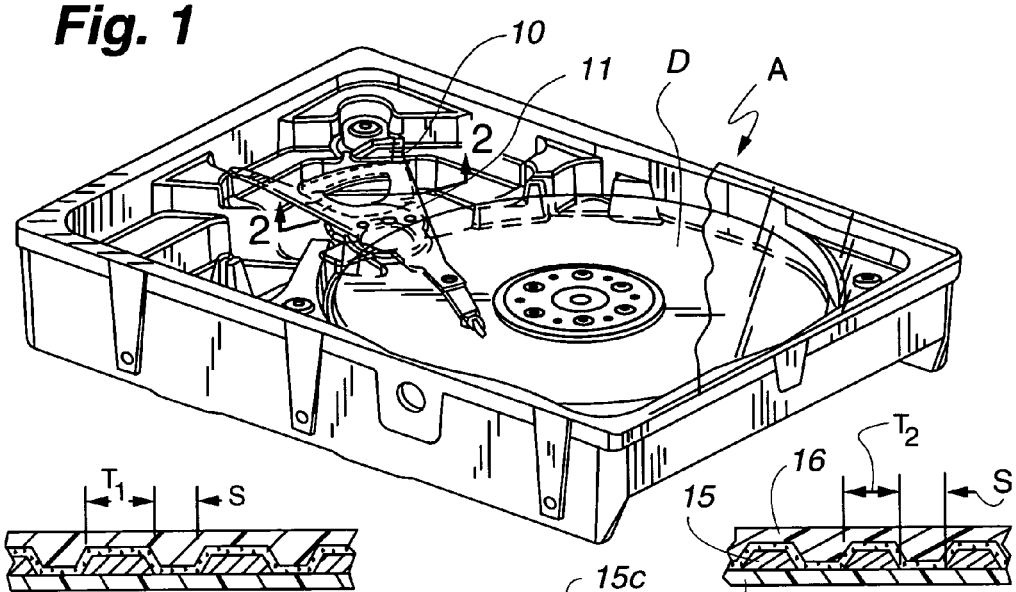
Fig. 1
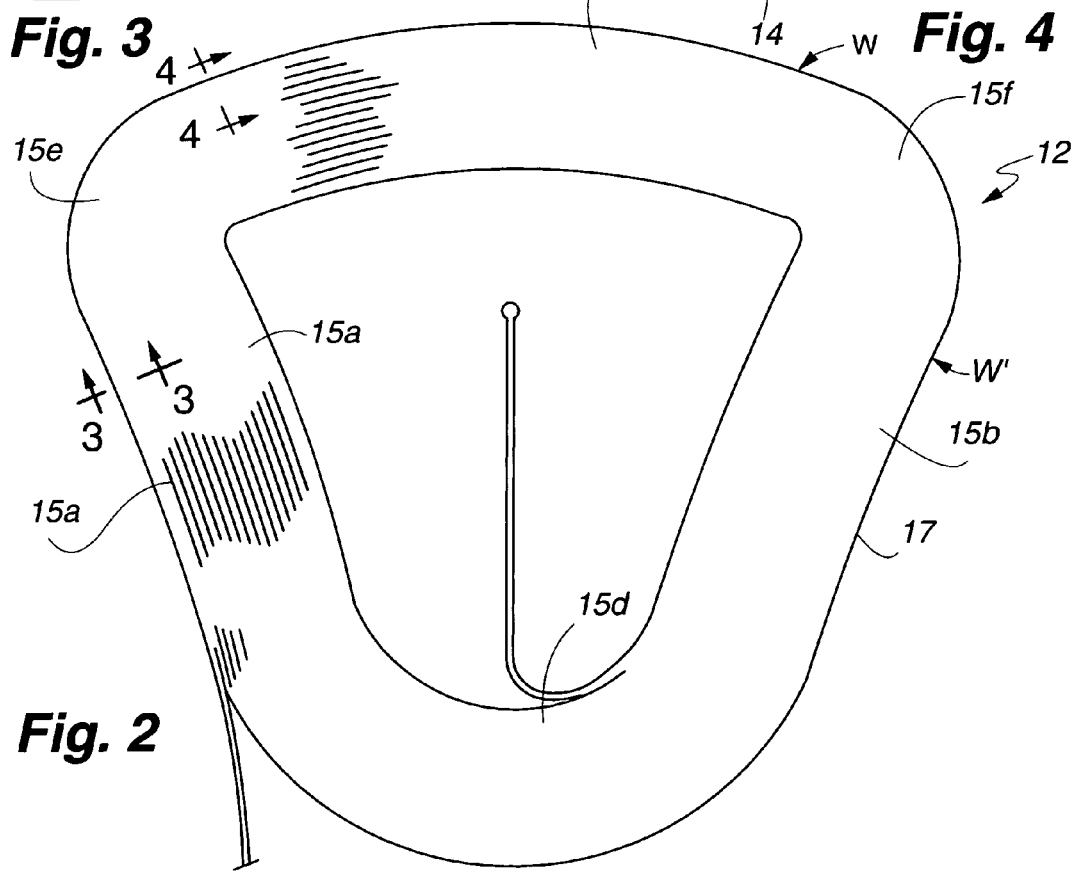
Fig. 3
Fig. 4
Fig. 2

VOICE COIL FOR DISK DRIVE

RELATED APPLICATIONS

The present application claims priority under 35 U.S.C. § 119(e) from U.S. Provisional Patent Application Ser. No. 60/156,411, filed Sep. 28, 1999, which provisional application is incorporated herein by reference in its entirety.

BACKGROUND OF THE INVENTION

1. Field of the Invention

The present invention relates to disk drives for information storage in computer systems, and more particularly to a coil assembly for a voice coil motor that drives an actuator arm of the disk drive.

2. Description of the Prior Art

Most disk drive storage systems include a plurality of disks stacked onto a rotatable spindle and a corresponding number of magnetic heads that read binary digital information from the disks and write such information on them. The magnetic heads lie mounted on sliders that an actuator arm suspends over the surfaces of the disks while the actuator arm lies rotatably mounted to a base member of the disk drive.

A voice coil motor drives the actuator arm; and this motor typically includes permanent magnets mounted to the base member and a wire and bobbin coil assembly mounted on the actuator arm. The forces generated by the interaction between the magnetic field of the coil assembly and those of the permanent magnets drive the actuator arm to various positions over the disks.

The prior art includes a large number of actuator arm assemblies with various coil and magnet arrangements. Some of these assemblies include multiple layers of wire secured to the actuator arm with adhesive and a plurality of permanent magnets disposed proximate the wire. These constructions require complex fabrication procedures; they are susceptible to malfunction; and they do not allow easy miniaturization of the disk drive.

SUMMARY OF THE INVENTION

The coil assembly of the present invention avoids the disadvantages of the prior art constructions. It is a unique single-layer structure that optimizes force vectors and mass distribution. This construction provides a planar coil that allows easy installation onto an actuator arm, minimizing the cost of manufacture and assembly and enhancing miniaturization of the drive. It is a simple construction that provides consistent and efficient performance.

In accordance with one embodiment of this invention, a voice coil for a disk drive includes a spiral formation of winding of an electrically conductive material. This formation has a generally triangular shape with an open center. First and second active leg portions of the formation curve inward of it, and an inactive leg portion curves outward of it. The cross-sectional area of the coil varies along its length with the segments in the inactive leg portion having a smaller cross-sectional area than those of the remaining active segments. The voice coil is a laminate with the conductive layer disposed between two electrically insulating layers. It lies fixedly secured to a surface of the actuator arm. The method of making this laminate includes securing the conductive layer to an insulating layer, removing selected portions of the conductive layer to form the coil, and covering the conductive layer with another insulating layer.

BRIEF DESCRIPTION OF THE DRAWINGS

For a more complete understanding of this invention, one should now refer to the embodiment illustrated in greater detail in the accompanying drawings and described below by way of an example of the invention. In the drawings:

FIG. 1 is a perspective view of a disk drive that includes the voice coil of the present invention;

FIG. 2 is a sectional view taken along line 2—2 in FIG. 1;

FIG. 3 is a sectional view taken along line 3—3 in FIG. 2; and

FIG. 4 is a sectional view taken along line 4—4 in FIG. 2.

While the following disclosure describes the invention in connection with one embodiment, one should understand that the invention is not limited to this embodiment. Furthermore, one should understand that the drawings are not to scale and that graphic symbols, diagrammatic representatives, and fragmentary views, in part, may illustrate the embodiment. In certain instances, the disclosure may not include details which are not necessary for an understanding of the present invention such as conventional details of fabrication and assembly.

DETAILED DESCRIPTION

Turning now to the drawings and referring specifically to FIG. 1, a disk drive apparatus A includes an actuator 10 with an arm 11 which supports the voice coil assembly 12 of the present invention and a pivot assembly (not shown) which pivotally connects the actuator 10 to a base of the disk drive apparatus A. Permanent magnets (not shown) disposed on the base provide a magnetic field that interacts with the magnetic field provided by the voice coil assembly 12 to drive the actuator to various positions over a disk D of the disk drive apparatus A.

The actuator 10 of this disk drive apparatus A is a planar structure suited for use in a single disk system. However, the voice coil assembly 12 may alternatively operate in other actuator constructions, including those used in multi-disk systems. The arm or base 11 of the actuator 10 is a flat plate-like member made out of aluminum, non-magnetic steel, or any other suitable material.

The voice coil assembly 12 is a laminate structure with a bottom, electrically insulating layer 14, a middle, electrically conductive layer 15, and a top, electrically insulating layer 16. The bottom and top layers may be polymide or any other suitable material while the middle layer may be copper or other conductive material. A laminating adhesive secures one layer to another layer as well as the bottom layer to the arm 11.

The conductive layer 15 is a single, spiraling trace that forms a generally triangular band 17 with an open center, first and second active legs, 15a and 15b, an inactive leg 15c, a first curved corner portion 15d connecting the first and second active leg portions, a second curved corner portion 15e connecting the first active leg portion with the inactive leg portion, and a third curved corner portion 15f connecting the second active leg portion with the inactive leg portion. The first and second active leg portions, 15a and 15b, curve inwardly of the band while the inactive leg portion 15c curves outwardly of it. (Also, although not necessary, the average radius of curvature of the first curved corner portion is greater than the average radius of curvature of the second and third corner portions; and the average radius of curvatures of the second and third corner portions is substantially the same.)

As shown in FIG. 2, the first and second leg portions of the band 17 each have a predetermined width W' while the third leg portion has a width W which is smaller in magnitude than the width of the first and second leg portions. While the spacing between each loop of the trace remains substantially the same throughout the trace, as does the height of the trace, the width varies, with the segments defining the third leg portion being substantially smaller than the segments defining the first and second leg portions (see FIGS. 3 and 4).

The pivot axis of the actuator 10 lies outwardly of the voice coil assembly 12 proximate the first curved corner portion 15d. Since the third, inactive leg portion lies the furthest of the three legs from the pivot axis, it makes a substantial contribution to actuator inertia. However, it does not provide any torque in the desired direction of rotation of the actuator because it directs the force that it generates towards the actuator pivot. A reduction in the trace width (or cross-sectional area) in the third leg portion results in a reduction in mass and inertia. However, the reduction in the width is not of a magnitude that would cause a significant increase in the resistance in this portion of the trace.

As described above, the first and second leg portions curve inwardly of the band 17. This "concave" configuration aligns the electromotive force vector better than straight or convex legs. This configuration provides a higher torque constant ($K_t$) than does the configuration of a conventional coil with a similar size.

The method of making the voice coil assembly 12 includes the following steps: securing a sheet of material (e.g., copper) that comprises the middle layer 15 to the bottom layer 14 (as with adhesive), removing (as with photo-etching) portions of the middle layer to form a single trace of varying cross-sectional area, and securing (as with adhesive) the top layer 16 to cover the band 17. The next step in this process includes securing (e.g., with adhesive) the bottom layer 14 to the arm 11.

By way of a specific example for a 3.5 inch disk drive form factor, a voice coil of the present invention was constructed with a bottom polymide layer having a height of 1 mil, a middle copper layer of 1.5 mil and top polymide layer of 1 mil. The maximum width $T_1$ for the trace in the first and second leg portions was 5 mil with a maximum spacing S between adjacent loops of 3 mil (see FIG. 3). The maximum width $T_2$ for the trace in the third, inactive leg portion was 3 mil with a maximum spacing S between adjacent segments of 3 mil (see FIG. 4).

While the above description and the drawings disclose and illustrate one embodiment, one should understand, of course, that the invention is not limited to this embodiment. Those skilled in the art to which the invention pertains may make other modifications and other embodiments employing the principles of this invention, particularly upon considering the foregoing teachings. Therefore, by the appended claims, the applicant intends to cover any modifications and other embodiments as incorporate those features which constitute the essential features of this invention.

What is claimed is:

1. A voice coil for a disk drive comprising: a spiral winding of conductive material defining a flat band with a generally triangular shape having an open center, first and second active leg portions and an inactive leg portion, a first curved corner portion connecting the first and second active leg portions, a second curved corner portion connecting the first active leg portion with the inactive leg portion, and a third curved corner portion connecting the second leg portion with the inactive leg portion, the first and second active leg portions curving inward of the band, the inactive leg portion curving outward of the band.

2. The coil of claim 1, wherein the radius of curvature of the first curved corner portion is greater than the radius of curvature of the second and third curved corner portions.

3. The coil of claim 2, wherein the radius of curvature of the second curved corner portion is equal to the radius of curvature of the third curved corner portion.

4. The coil of claim 1, wherein the cross-sectional area of the band varies along the length of the spiral winding.

5. The coil of claim 4, wherein the cross-sectional area of the segments that define the inactive leg portion is smaller than the cross-sectional area of the remaining segments that define the first and second active leg portions.

6. A voice coil for a disk drive comprising: a rotatable spiral winding of conductive material defining a flat band with a generally triangular shape with an open center, first and second active leg portions and an inactive leg portion, a first curved corner portion connecting the first and second active leg portions, a second curved corner portion connecting the first active leg portion with the inactive leg portion, and a third curved corner portion connecting the second active leg portion with the inactive leg portion, the cross-sectional area of the band varying along its length.

7. The coil of claim 6, wherein the cross-sectional area of each of the segments that define the inactive leg portion is smaller than the cross-sectional area of each of the remaining segments that define the first and second active leg portions.

8. The coil of claim 6, wherein the radius of curvature of the first curved corner portion is greater than the radius of curvature of the second and third curved corner portions.

9. The coil of claim 8, wherein the radius of curvature of the second curved corner portion is equal to the radius of curvature of the third curved corner portion.

10. The coil of claim 6, with the first and second active leg portions curving inward of the band, and the inactive leg portion curving outward of the band.

11. In combination with an actuator member in a disk drive, a voice coil secured to a face of the actuator member, said voice coil comprising a continuous spiral winding defining a flat band with a generally triangular shape with an open center, first and second active leg portions and an inactive leg portion, a first curved corner portion connecting the first and second active leg portions, a second curved corner portion connecting the first active leg portion with the inactive leg portion, and a third curved corner portion connecting the second active leg portion with the inactive leg portion, the first and second active leg portions curving inward of the band, the inactive leg portion curving outward of the band.

12. The coil of claim 11, wherein the radius of curvature of the first curved corner portion is greater than the radius of curvature of the second and third curved corner portions.

13. The coil of claim 12, wherein the radius of curvature of the second curved corner portion is equal to the radius of curvature of the third curved corner portion.

14. The coil of claim 11, wherein the cross-sectional area of the band varies along its length.

15. The coil of claim 14, wherein the cross-sectional area of the segments that define the inactive leg portion is smaller than the cross-sectional area of the remaining segments that define the first and second active leg portions.

16. In combination with an actuator member in a disk drive, a voice coil secured to a face of the actuator member, said voice coil comprising a continuous rotatable spiral winding of wire defining a flat band with a generally triangular shape with an open center, first and second active leg portions and an inactive leg portion, a first curved corner portion connecting the first and second active leg portions, a second curved corner portion connecting the first active leg portion with the inactive leg portion, and a third curved corner portion connecting the second active leg portion with the inactive leg portion, the cross-sectional area of the band varying along its length.

17. The coil of claim 16, wherein the cross-sectional area of the segments that define the inactive leg portion is smaller than the cross-sectional area of the remaining segments that define the first and second active leg portions.

18. The coil of claim 16, wherein the radius of curvature of the first curved corner portion is greater than the radius of curvature of the second and third curved corner portions.

19. The coil of claim 18, wherein the radius of curvature of the second curved corner portion is equal to the radius of curvature of the third curved corner portion.

20. The coil of claim 16, with the first and second active leg portions curving inward of the band, and the inactive leg portion curving outward of the band.

21. A voice coil for driving an actuator arm to various positions over a disk of a disk drive, the voice coil comprising:
   a spiral winding of conductive material defining a band with a generally triangular shape having an open center, wherein the spiral winding includes:
      a first active leg portion that curves inwardly of the band; a second active leg portion that curves inwardly of the band;
      an inactive leg portion;
      a first curved corner portion connecting the first and second active leg portions;
      a second curved corner portion connecting the first active leg portion and the inactive leg portion; and
      a third curved corner portion connecting the second active leg portion and the inactive leg portion.

22. The voice coil of claim 21, wherein the spiral winding is a planar coil.

23. The voice coil of claim 21, wherein the spiral winding is a single-layer coil.

24. The voice coil of claim 21, wherein the spiral winding is a planar single-layer coil.

25. The voice coil of claim 21, wherein the spacing between each loop of the spiral winding remains substantially the same throughout the spiral winding.

26. The voice coil of claim 21, wherein the height of the spiral winding remains substantially the same throughout the spiral winding.

27. The voice coil of claim 21, wherein the spacing between each loop of the spiral winding remains substantially the same throughout the spiral winding, and the height of the spiral winding remains substantially the same throughout the spiral winding.

28. The voice coil of claim 21, wherein a width of spiral winding segments defining the inactive leg portion is substantially smaller than a width of spiral winding segments defining the first and second active leg portions.

29. The voice coil of claim 28, wherein a width of spiral winding segments defining the first active leg portion is the same as a width of spiral winding segments defining the second active leg portion.

30. The voice coil of claim 21, wherein a cross-sectional area of spiral winding segments defining the inactive leg portion is substantially smaller than a cross-sectional area of spiral winding segments defining the first and second active leg portions.

31. The voice coil of claim 30, wherein a cross-sectional area of spiral winding segments defining the first active leg portion is the same as a cross-sectional area of spiral winding segments defining the second active leg portion.

32. The voice coil of claim 21, further comprising a top insulative layer and a bottom insulative layer, wherein the spiral winding is sandwiched between the top and bottom insulative layers.

33. The voice coil of claim 32, wherein the top and bottom insulative layers are polyimide and the spiral winding is copper.

34. The voice coil of claim 32, wherein the top insulative layer is secured to the spiral winding by an adhesive.

35. The voice coil of claim 32, wherein the bottom insulative layer is secured to the spiral winding by an adhesive.

36. The voice coil of claim 32, wherein the top and bottom insulative layers are secured to the spiral winding by adhesives.

37. A voice coil for driving an actuator arm to various positions over a disk of a disk drive, the voice coil comprising:
   a spiral winding of conductive material defining a flat band with a generally triangular shape having an open center, wherein the spiral winding is adapted to interact with the magnetic field of permanent magnets of the disk drive, and the spiral winding is a continuous planar single-layer coil that includes:
      a first active leg portion that curves inwardly of the band;
      a second active leg portion that curves inwardly of the band;
      an inactive leg portion;
      a first curved corner portion connecting the first and second active leg portions;
      a second curved corner portion connecting the first active leg portion and the inactive leg portion; and
      a third curved corner portion connecting the second active leg portion and the inactive leg portion.

38. The voice coil of claim 37, wherein the spacing between each loop of the spiral winding remains substantially the same throughout the spiral winding, and the height of the spiral winding remains substantially the same throughout the spiral winding.

39. The voice coil of claim 37, wherein a cross-sectional area of spiral winding segments defining the inactive leg portion is substantially smaller than a cross-sectional area of spiral winding segments defining the first and second active leg portions, and a cross-sectional area of spiral winding segments defining the first active leg portion is the same as a cross-sectional area of spiral winding segments defining the second active leg portion.

40. The voice coil of claim 37 further comprising a top insulative layer and a bottom insulative layer, wherein the spiral winding is sandwiched between the top and bottom insulative layers and secured to the top and bottom insulative layers by adhesives.

41. A voice coil for driving an actuator arm to various positions over a disk of a disk drive, the voice coil comprising:
  a rotatable spiral winding of conductive material defining a band with a generally triangular shape having an open center, wherein the spiral winding includes:
    a first active leg portion defined by segments having a first cross-sectional area;
    a second active leg portion defined by segments having a second cross-sectional area;
    an inactive leg portion defined by segments having a third cross-sectional area, wherein the third cross-sectional area is smaller than the first cross-sectional area, and the third cross-sectional area is smaller than the second cross-sectional area;
    a first curved corner portion connecting the first and second active leg portions;
    a second curved corner portion connecting the first active leg portion and the inactive leg portion; and
    a third curved corner portion connecting the second active leg portion and the inactive leg portion.

42. The voice coil of claim 41, wherein the spiral winding is a planar coil.

43. The voice coil of claim 41, wherein the spiral winding is a single-layer coil.

44. The voice coil of claim 41, wherein the spiral winding is a planar single-layer coil.

45. The voice coil of claim 41, wherein the spacing between each loop of the spiral winding remains substantially the same throughout the spiral winding.

46. The voice coil of claim 41, wherein the height of the spiral winding remains substantially the same throughout the spiral winding.

47. The voice coil of claim 41, wherein the spacing between each loop of the spiral winding remains substantially the same throughout the spiral winding, and the height of the spiral winding remains substantially the same throughout the spiral winding.

48. The voice coil of claim 41, wherein a width of the segments defining the inactive leg portion is substantially smaller than a width of the segments defining the first and second active leg portions.

49. The voice coil of claim 48, wherein a width of the segments defining the first active leg portion is the same as a width of the segments defining the second active leg portion.

50. The voice coil of claim 41, wherein the cross-sectional area of the segments defining the inactive leg portion is substantially smaller than the cross-sectional area of the segments defining the first and second active leg portions.

51. The voice coil of claim 50, wherein the cross-sectional area of the segments defining the first active leg portion is the same as the cross-sectional area of the segments defining the second active leg portion.

52. The voice coil of claim 41, further comprising a top insulative layer and a bottom insulative layer, wherein the spiral winding is sandwiched between the top and bottom insulative layers.

53. The voice coil of claim 52, wherein the top and bottom insulative layers are polyimide and the spiral winding is copper.

54. The voice coil of claim 52, wherein the top insulative layer is secured to the spiral winding by an adhesive.

55. The voice coil of claim 52, wherein the bottom insulative layer is secured to the spiral winding by an adhesive.

56. The voice coil of claim 52, wherein the top and bottom insulative layers are secured to the spiral winding by adhesives.

57. A voice coil for driving an actuator arm to various positions over a disk of a disk drive, the voice coil comprising:
  a rotatable spiral winding of conductive material defining a flat band with a generally triangular shape having an open center, wherein the spiral winding is adapted to interact with the magnetic field of permanent magnets of the disk drive, and the spiral winding is a continuous planar single-layer coil that includes:
    a first active leg portion defined by segments having a first cross-sectional area;
    a second active leg portion defined by segments having a second cross-sectional area;
    an inactive leg portion defined by segments having a third cross-sectional area, wherein the third cross-sectional area is smaller than the first cross-sectional area, and the third cross-sectional area is smaller than the second cross-sectional area;
    a first curved corner portion connecting the first and second active leg portions;
    a second curved corner portion connecting the first active leg portion and the inactive leg portion; and
    a third curved corner portion connecting the second active leg portion and the inactive leg portion.

58. The voice coil of claim 57, wherein the spacing between each loop of the spiral winding remains substantially the same throughout the spiral winding, and the height of the spiral winding remains substantially the same throughout the spiral winding.

59. The voice coil of claim 57, wherein the cross-sectional area of the segments defining the inactive leg portion is substantially smaller than the cross-sectional area of the segments defining the first and second active leg portions, and a cross-sectional area of the segments defining the first active leg portion is the same as a cross-sectional area of the segments defining the second active leg portion.

60. The voice coil of claim 57, further comprising a top insulative layer and a bottom insulative layer, wherein the spiral winding is sandwiched between the top and bottom insulative layers and secured to the top and bottom insulative layers by adhesives.

* * * * *